(12) United States Patent
Greszler et al.

(10) Patent No.: US 11,311,059 B2
(45) Date of Patent: Apr. 26, 2022

(54) ILLUMINATED INDICATOR ASSEMBLY HAVING PARTICULAR APPLICATION TO CLOTHING

(71) Applicant: Lumitex, Inc., Strongsville, OH (US)

(72) Inventors: Alan Greszler, Westlake, OH (US); Kevin Friedman, Fairview Park, OH (US); Benjamin Dalessandro, Middleburg Heights, OH (US); Vedang Kothari, Cleveland, OH (US)

(73) Assignee: Lumitex, Inc., Strongsville, OH (US)

( * ) Notice: Subject to any disclaimer, the term of this patent is extended or adjusted under 35 U.S.C. 154(b) by 214 days.

(21) Appl. No.: 16/491,589

(22) PCT Filed: Apr. 4, 2018

(86) PCT No.: PCT/US2018/026029
§ 371 (c)(1),
(2) Date: Sep. 6, 2019

(87) PCT Pub. No.: WO2018/187432
PCT Pub. Date: Oct. 11, 2018

(65) Prior Publication Data
US 2021/0153574 A1 May 27, 2021

Related U.S. Application Data (60) Provisional application No. 62/481,370, filed on Apr. 4, 2017.

(51) Int. Cl.
*A41D 13/01* (2006.01)
*H05B 47/12* (2020.01)
(Continued)

(52) U.S. Cl.
CPC .......... *A41D 13/01* (2013.01); *F21V 33/0008* (2013.01); *G08B 5/36* (2013.01);
(Continued)

(58) Field of Classification Search
CPC .... A41D 13/01; A41D 2600/20; G08B 21/14; G08B 21/16; G08B 5/36; G08B 21/02;
(Continued)

(56) References Cited

U.S. PATENT DOCUMENTS 6,784,795 B1 * 8/2004 Pories ................. A42B 3/0453
340/464
9,086,215 B2 * 7/2015 Timmerberg .............. B62J 6/05
(Continued)

FOREIGN PATENT DOCUMENTS

GB          2459944 A      11/2009
WO       2008043103 A2      4/2008
(Continued)

OTHER PUBLICATIONS

Hou et al. A portable embedded toxic gas detection device based on a cross-responsive sensor array ,Sensors and Actuators B 161 (2012) 244-250 (Year: 2011).*

(Continued)

*Primary Examiner* — Tracie Y Green
(74) *Attorney, Agent, or Firm* — Grant Steyer (57) ABSTRACT

An illuminated clothing article (8) including an indicator assembly (10, 12) having at least one light source (22), circuitry (14, 16, 18, 22), and a sensor (14, 16). The circuitry (14, 16, 18, 22) is configured to modulate at least one property of the light (22) emitted by the at least one light source (22) in response an external variable sensed by the sensor (14, 16). An illuminated clothing article (8) including an indicator assembly (10, 12) having at least one light source (22), circuitry (14, 16, 18, 22), and a sensor (14, 16). The circuitry (14, 16, 18, 22) is configured to modulate at least one property of the light (22) emitted by the at least one light source (22) in response an external variable sensed by the sensor (14, 16).

24 Claims, 4 Drawing Sheets

(51) Int. Cl.
- *H05B 47/11* (2020.01)
- *H05B 47/19* (2020.01)
- *H05B 47/16* (2020.01)
- *H05B 47/105* (2020.01)
- *F21V 33/00* (2006.01)
- *G08B 5/36* (2006.01)
- *G08B 21/02* (2006.01)
- *G08B 21/14* (2006.01)
- *G08B 21/16* (2006.01)

(52) U.S. Cl.
CPC ............. *G08B 21/02* (2013.01); *G08B 21/14* (2013.01); *G08B 21/16* (2013.01); *H05B 47/105* (2020.01); *H05B 47/11* (2020.01); *H05B 47/12* (2020.01); *H05B 47/16* (2020.01); *H05B 47/19* (2020.01); *A41D 2600/20* (2013.01)

(58) Field of Classification Search
CPC ........ H05B 47/12; H05B 47/11; H05B 47/19; H05B 47/16; H05B 47/105; F21V 33/0008
See application file for complete search history.

(56) References Cited

U.S. PATENT DOCUMENTS

| | | | |
|---|---|---|---|
| 10,132,490 B1* | 11/2018 | Olivero | A63F 9/0604 |
| 2008/0089056 A1* | 4/2008 | Grosjean | F21V 23/0407 |
| | | | 362/103 |
| 2014/0254143 A1* | 9/2014 | Wansor | F21V 33/0008 |
| | | | 362/103 |
| 2015/0250043 A1* | 9/2015 | Timmerberg | A41D 13/01 |
| | | | 315/153 |

FOREIGN PATENT DOCUMENTS

| | | |
|---|---|---|
| WO | 2016196483 A1 | 12/2016 |
| WO | 2017036507 A1 | 3/2017 |

OTHER PUBLICATIONS

Wearable Sensors Fundamentals, Implementation and Applications 2014, pp. 65-83 (Year: 2014).*
International Search Report and Written Opinion dated Jun. 4, 2018 issued in PCT/US2018/026029.

* cited by examiner

FIG. 4

ILLUMINATED INDICATOR ASSEMBLY HAVING PARTICULAR APPLICATION TO CLOTHING

RELATED APPLICATIONS

This application is a national phase entry of International Application No. PCT/US2018/026029 filed on Apr. 4, 2018 and published in the English language, which claims priority to US Application No. 62/481,370 filed Apr. 4, 2017, both of which are hereby incorporated by reference.

TECHNICAL FIELD

The present invention relates generally to clothing having illumination assemblies that can be worn by an individual and in particular to illuminated clothing articles including an indicator assembly coupled to a sensor.

BACKGROUND

Every year hundreds of road construction workers lose their lives. In fact, from 2003-2014, an estimated 1,435 workers lost their lives at road construction sites in the United States. To improve the visibility of road workers and work areas, high visibility reflective strips are used on clothing and traffic cones. The reflective strips collect and reflect incident light to improve the visibility of road workers when illuminated by an automobile's headlights.

Heretofore, illuminated vests are believed to have utilized electroluminescent strips or light emitting diodes to improve the visibility of road workers. However, these vests have certain drawbacks that make them non-ideal for hi-visibility clothing: The light emitting diodes (LED) in these vests may cause hotspots that on direct viewing can cause visibility issues while electroluminescent lights require high voltage and frequency to drive the electronics which may make them unsafe in some hazardous areas.

SUMMARY

While reflective strips improve the visibility of road workers, the strips are only visible when illuminated by an external light source. For this reason, when located around a bend, reflective strips found on road workers are not visible to a driver and workers will not be visible to one another.

The present invention provides an indicator assembly (e.g., that can be included in a vest) that includes a light source. By including a light source (as opposed to reflective strips) in a vest worn by construction workers, the visibility of construction workers on the road is improved.

An indicator assembly provided by the present invention is further configured to modify a property of light emitted by the light source based on a sensed external variable. For example, the vest including the indicator assembly may detect oncoming cars (e.g., based on approaching headlights). The light source of the indicator assembly may be controlled to flash or change colors to further improve the visibility of constructions workers while reducing the effect of power draining lighting effects (e.g., higher frequency flashing, increased light intensity, etc.) on battery life.

As another example, an indicator assembly of the present invention may be included in the vest of a miner. Upon the indicator assembly sensing the presence of a harmful compound (e.g., natural gas or carbon monoxide), the indicator assembly may change the color of emitted light, cause the emitted light to flash, etc. In this way, the indicator assembly may notify miners of potentially dangerous situations. Firefighters may also find such an indicator assembly useful.

An indicator assembly provided by the present invention preferably utilizes a light guide to propagate light emitted by a light source (e.g., an LED) to avoid problems caused by directly viewing the light source.

According to one aspect of the invention, an illuminated clothing article is provided that can be worn by an individual. The illuminated clothing article includes an indicator assembly that has an illumination assembly, a sensor, and circuitry. The illumination assembly includes at least one light source having a light emitting portion. Upon activation, the at least one light source is configured to emit light having at least one wavelength via the light emitting portion. The sensor is communicatively coupled to the circuitry and is configured to sense an external variable. The sensed external variable may comprise at least one of a propagating signal or an environmental variable. The circuitry is configured to modulate at least one property of the light emitted by the at least one light source in response to the sensed external variable.

Alternatively or additionally, the external variable comprises the environmental variable and the environmental variable comprises at least one of a level of illumination, a velocity of the indicator assembly, properties of sound waves received by the indicator assembly, the level of illumination at a particular wavelength, or presence of a particular compound.

Alternatively or additionally, the presence of a particular compound may comprise a presence of at least one of natural gas, ammonia, and/or flammable materials.

Alternatively or additionally, the at least one property of the light emitted by the at least one light source may comprise at least one of starting or stopping emission of light, wavelength of emitted light, duration of emission of the emitted light, and/or intensity of the emitted light.

According to another aspect of the invention, an indicator assembly includes an illumination assembly, a sensor, and associated circuitry. The illumination assembly includes at least one light source. The at least one light source has a light emitting portion. Upon activation, the at least one light source is configured to emit light having at least one wavelength via the light emitting portion. The sensor is communicatively coupled to the circuitry and is configured to sense an external variable. The sensed external variable may comprise at least one of a propagating signal or an environmental variable. The circuitry may be configured to modulate at least one property of the light emitted by the at least one light source in response to the sensed external variable.

Alternatively or additionally, the illumination assembly additionally may include a light guide configured to propagate light. The light guide may include a light emitting surface, a distal end, a proximal end, and an optical pattern. The proximal end may be optically coupled to the light emitting portion of the at least one light source. The light emitted by the at least one light source may be received at the proximal end and propagated from the proximal end towards the distal end of the light guide. The optical pattern may be configured to cause the light propagated by the light guide to be emitted from the light emitting surface.

Alternatively or additionally, the external variable may be the environmental variable and the environmental variable may comprise at least one of a level of illumination, a velocity of the indicator assembly, properties of sound waves received by the indicator assembly, the level of illumination at a particular wavelength, and/or presence of a particular compound.

Alternatively or additionally, the presence of a particular compound may be a presence of at least one of natural gas, ammonia, and/or flammable materials.

Alternatively or additionally, the at least one property of the light emitted by the at least one light source may comprise at least one of starting or stopping emission of light, wavelength of emitted light, duration of emission of the emitted light, and/or intensity of the emitted light.

Alternatively or additionally, the circuitry may be configured to modulate a frequency of light emission by the at least one light source based on the sensed external variable according to a predetermined encoding.

Alternatively or additionally, the frequency of light emission may be at least 60 hertz.

Alternatively or additionally, the external variable may be the environmental variable and the sensed environmental variable may be a status of equipment separate from the indicator assembly.

Alternatively or additionally, the sensor may comprise a wireless communication interface configured to communicate with and receive parameters from a device separate from the indicator assembly. The environmental variable may be the propagating signal and the propagating signal may comprise the received parameters. The circuitry may be configured to modulate at least one property of the light emitted by the at least one light source based on the received parameters.

Alternatively or additionally, indicator assembly may include a location sensor configured to output a location of the indicator assembly. The wireless communication interface may receive at least one location coordinate. The circuitry may be further configured to modulate at least one property of light emitted by the at least one light source based on a distance between the location of the indicator assembly and the received at least one location coordinate.

Alternatively or additionally, the circuitry may modulate the at least one property of the light emitted by the at least one light source if the distance between the location of the indicator assembly and the received at least one location coordinate is less than a threshold or otherwise satisfies a prescribed criteria.

Alternatively or additionally, an illuminated clothing article includes the indicator assembly. The received parameters may specify a safety condition and the circuitry may modulate at least one property of the light emitted by the at least one light source based on the specified safety condition.

Alternatively or additionally, the received parameters may comprise a group identifier and the circuitry may modulate at least one property of the light emitted by the at least one light source according to a particular light property associated with the received group identifier.

Alternatively or additionally, an illuminated clothing article may include the indicator assembly, a front portion, and a back portion. The illumination assembly may include a first illumination assembly and a second illumination assembly, the light guide of the first illumination assembly being located on the front portion and the light guide of the second illumination assembly being located on the back portion. A property of the light emitted by the first illumination assembly may differ from the property of the light emitted by the second illumination assembly.

Alternatively or additionally, the illuminated clothing article may be a vest, belt, helmet, jacket, shirt, and/or gloves, by way of example.

Alternatively or additionally, an illuminated clothing article may include the indicator assembly, a body portion, and a limb portion. The light emitting surface of the light guide of the indicator assembly may comprise a light signaling area and an illumination area. The illumination area may be located on a distal end of the limb portion. The illumination area may be configured to emit light from the light guide, such that a predetermined area at a known distance and orientation from the illumination area is illuminated.

Alternatively or additionally, the at least one light source may comprise a first light source and a second light source. The first light source may be configured to output light having a different wavelength than light emitted by the second light source and/or output light at a different time interval than the light emitted by the second light source.

Alternatively or additionally, the indicator assembly may further comprise a power source for supplying power to the circuitry and the at least one light source.

Alternatively or additionally, the indicator assembly may additionally include a housing containing the power source and the circuitry. The housing may be electrically isolated from external electrical sources.

Alternatively or additionally, the optical pattern may be configured to cause light to be emitted from the light emitting surface, such that a portion of the emitted light appears as a symbol.

Alternatively or additionally, the illumination assembly may comprise a plurality of illumination assemblies. The circuitry controls emission of light by each of the plurality of illumination assemblies such that each of the plurality of illumination assemblies emits light while at least one of the other plurality of illumination assemblies are not emitting light.

Alternatively or additionally, the circuitry may control emission of light by the plurality of illumination assemblies such that the plurality of illumination assemblies are sequentially illuminated with respect to physical locations of the plurality of illumination assemblies.

While a number of features are described herein with respect to embodiments of the invention; features described with respect to a given embodiment also may be employed in connection with other embodiments.

The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention in which similar reference numerals are used to indicate the same or similar parts in the various views.

DETAILED DESCRIPTION

The present invention provides an illuminated clothing article including an indicator assembly having an illumination assembly, circuitry, and a sensor. The illumination assembly preferably includes at least one light emitting diode and preferably a light guide configured to propagate light emitted by the light emitting diode. The light guide preferably includes an optical pattern configured to cause light propagated by the light guide to be emitted from the light emitting surface. The circuitry is configured to modify a property of light emitted by the light source based on an external variable detected by the sensor.

Figure 1:
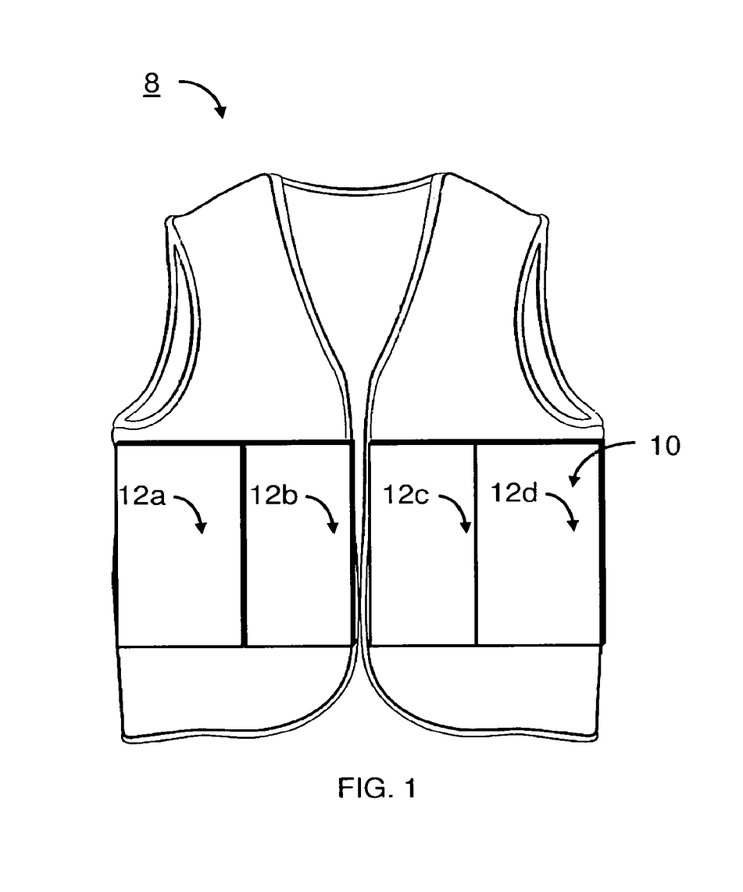
FIG. 1 is a front view of an exemplary embodiment of an illuminated clothing article including an indicator assembly.
Figure 2:
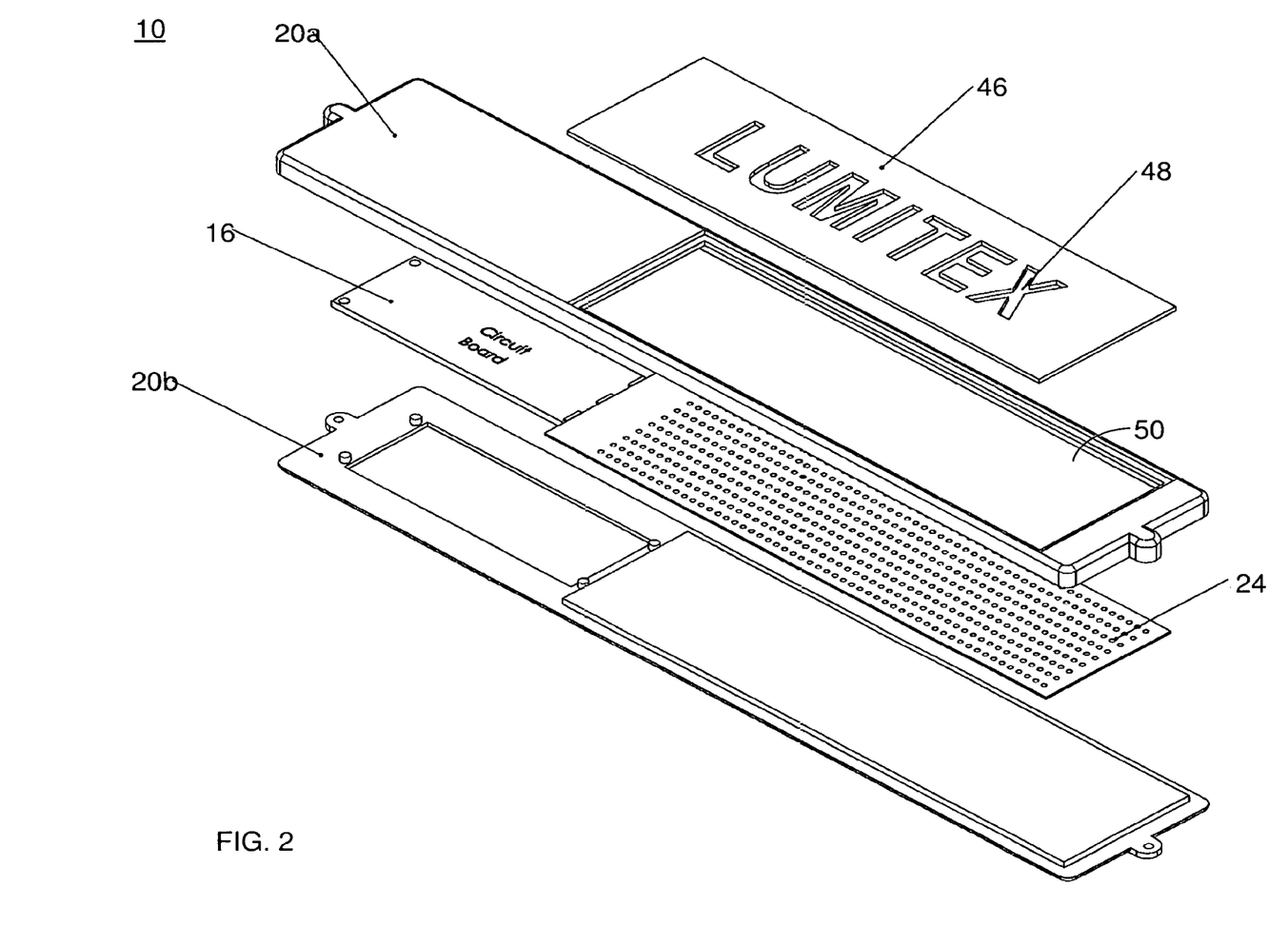
FIG. 2 is an exploded perspective view of an exemplary indicator assembly included in the illuminated clothing article of FIG. 1.
Figure 3:
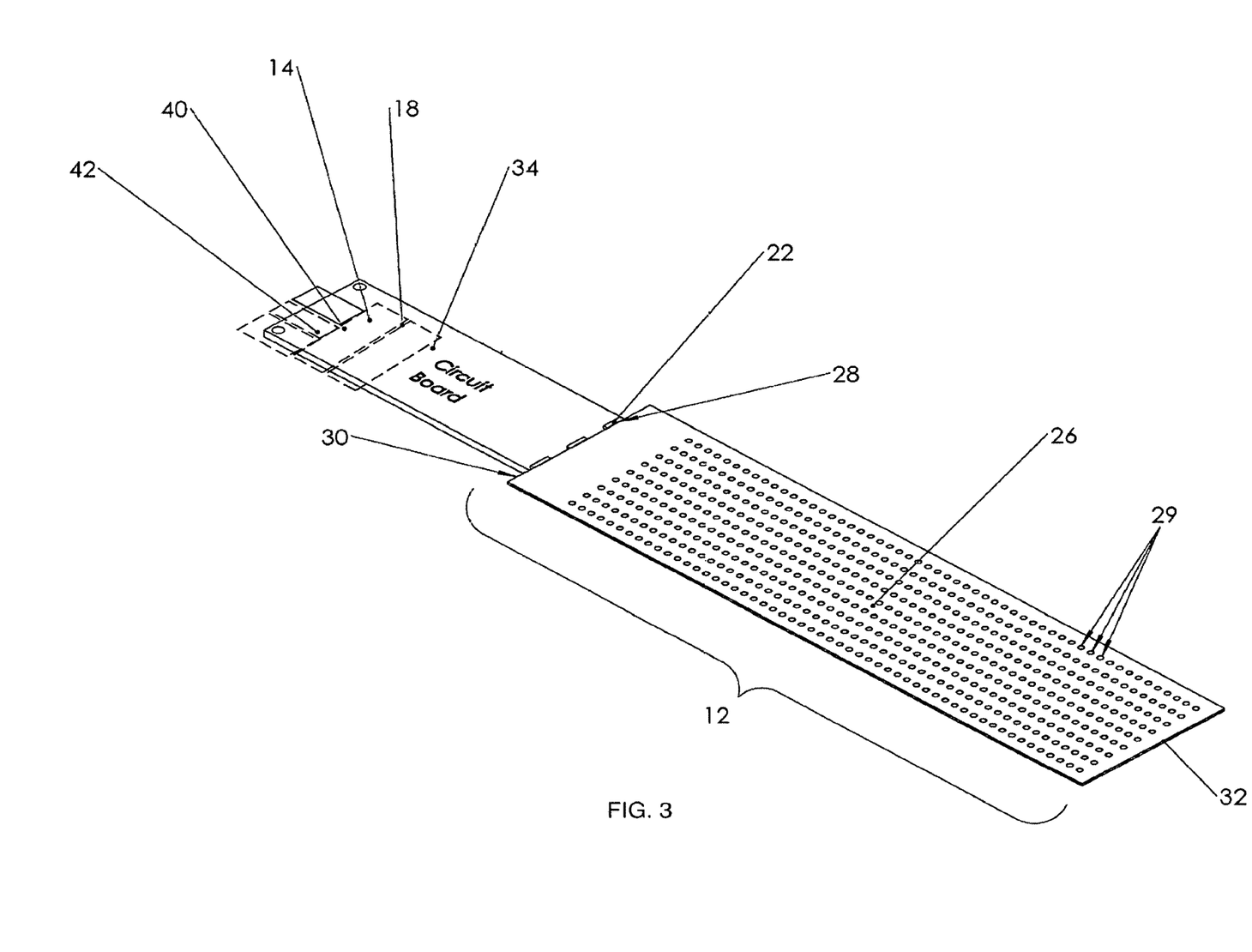
FIG. 3 is a perspective view of an exemplary illumination assembly used in the indicator assembly of FIG. 2.

Turning to FIGS. 1-3, an exemplary illuminated clothing article 8 according to the invention is provided with an indicator assembly 10. The illustrated clothing article is a vest, but it will be understood that principles of the invention may be practiced with other types of wearing apparel, such as shirts, pants, jackets, gloves, belts, etc.

The indicator assembly 10 includes an illumination assembly 12, circuitry 16, and sensor 14. The indicator assembly 12 typically additionally includes a housing 20 that may contain the illumination assembly 12, sensor 14, and circuitry 18. The indicator assembly may be integrated into the clothing article by any suitable means, such as by attachment to an exterior of the vest, placement in a pocket that is transparent or translucent on its our side, sewn into the clothing article, etc.

As will be understood by one of ordinary skill in the art, the indicator assembly 10 may have uses other than in clothing, although below described in relation to an article of clothing.

The illumination assembly 12 includes at least one light source 22 (e.g., at least one light emitting diode) and preferably a light guide 24. The light guide 24 is configured to propagate light emitted by the at least one light source 22. An optical pattern 29 of the light guide 24 causes the light propagated by the light guide 24 to be emitted from a light emitting surface 26 of the light guide 24. The circuitry 16 controls emission of light by the at least one light source 22.

The sensor 14 is configured to sense at least one external variable and output a signal corresponding to the sensed external variable(s). The external variable may comprise a propagating signal and/or an environmental variable. The propagating signal may comprise electromagnetic radiation. For example, the propagating signal may include radio waves, a GPS signal, a WIFI signal, a Bluetooth signal, etc.

The environmental variable(s) sensed by the sensor 14 may include at least one of a level of illumination, a velocity or acceleration of the indicator assembly, properties of sound waves received by the indicator assembly, the level of illumination at a particular wavelength (e.g., the presence of near infrared or near ultraviolet light), presence of a particular compound (e.g., specific gasses, such as natural gas, chlorine, etc.), or other properties. For example, the environmental variable(s) may preferentially exclude (i.e., not include) sound waves. Alternatively or additionally, the sensed environmental variable or variables may also comprise a status of equipment separate from the indicator assembly. For example, the environmental variable may signify the detachment of a strap or buckle, the malfunction of a mobile communication device, etc.

Detachment of a strap or buckle may be sensed in any suitable manner. For example, the detachment may be detected due to a missing voltage or signal of the separate equipment. As another example, the detachment may be sensed based on communication between the sensor 14 and an external sensor located on the buckle or strap. The external sensor may communicate to the sensor 14 when the strap or buckle becomes detached. Malfunction of the mobile communication device may similarly be detected based on communication between the sensor 14 and an external sensor configured to provide information regarding a status of the mobile communication device. Alternatively or additionally, the sensor 14 may be in wireless communication with the mobile communication device and the circuitry 22 may determine when the mobile communication device malfunctions based on the data communicated from the mobile communication device to the sensor 14. Upon detecting a detachment or malfunction, the circuitry 22 may wait a prescribed period of time before signaling the detachment/malfunction to reduce false positives (e.g., an apparent malfunction that is simply a short term loss of a WIFI signal).

As will be understood by one of ordinary skill in the art, the sensor 14 may comprise a capacitive sensor, a light sensor, an accelerometer, a microphone, a GPS receiver, a radio receiver, a wireless communication interface, or any other suitable device for sensing propagating signals and/or environmental variables.

The circuitry 16 may be configured to adjust at least one property of the light emitted by the light source(s) 22 in response to the sensed external variable(s). The property of the light emitted by the light emitting diode(s) may include starting or stopping emission of light (e.g., activating an inactive light source to emit red light on a jacket collar), wavelength, duration of emission, intensity, and/or other light property.

For example, the circuitry 16 may be configured to detect a level of illumination based on an output of the sensor 14 and cause a property of the light emitted by the light guide 24 to change. The property of the light emitted by the light guide 24 may change in color or duration. The circuitry 16 may be configured to activate the light source(s) 22 to emit light when the sensed environmental variable(s) satisfies a predetermined criterion. For example, the circuitry 16 may be configured to increase an intensity of the light emitted by the illumination assembly 12 as the level of illumination sensed by the sensor 14 decreases.

Alternatively or additionally, the circuitry 16 may be configured to deactivate the light source(s) 22 such that the light source(s) 22 does not emit light when the sensed environmental variable(s) returns to a preset baseline value. For example, the circuitry 16 may only activate the light source(s) 22 to emit light when the ambient illumination sensed by the sensor 16 is below a preset baseline value (i.e., when it is sufficiently dark).

In another example, if transient increases in light are detected, the circuitry 16 may be configured to increase an intensity of light emitted by the illumination assembly 12 or to flash the light emitted by the illumination assembly 12. In this example, a construction worker on the side of a road at night may be wearing an illuminated clothing article 8 (e.g., a vest) including the indicator assembly 10. The sensor 14 of the indicator assembly 10 may detect the presence of car headlights based on increases in sensed illumination. As will be understood by one of ordinary skill in the art, the circuitry 16 may determine the presence of car headlights using any suitable technique (e.g., based on intensity of illumination, duration of illumination, and/or rate of change of illumination).

Alternatively, approaching vehicles may be detected using an external sensor. The external sensor may comprise a switch mechanically activated by the vehicles (e.g., a mechanical or pneumatic tubing laid across road). In another example, the external search may be located on construction zone sign(s).

Figure 4:
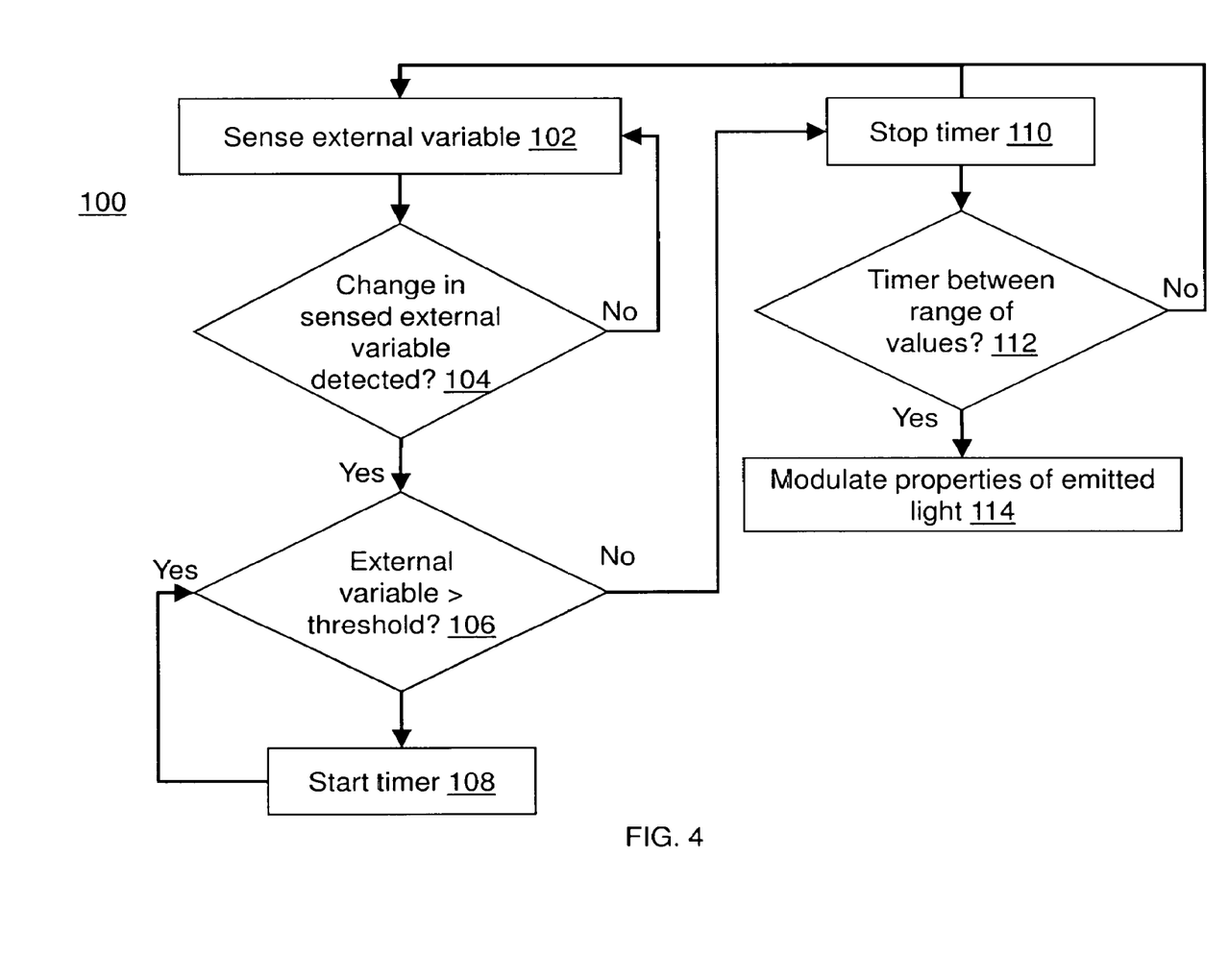
FIG. 4 is a flow chart depicting a method for controlling an indicator assembly.

An exemplary method 100 for detecting headlights is shown in FIG. 4. In process block 102, the external variable is sensed. In decision block 104, a check is performed to determine if a change in the external variable has been detected. If a change was not detected, then processing returns to block 102. If a change was detected, then a check is performed in decision block 106 to determine if the external variable is greater than a given threshold.

If the external variable is not given than the threshold, then processing moves to process block 110. If the external variable is greater than the threshold, then processing moves to process block 108. In process block 108, a timer is started and processing returns to decision block 106. In this way, processing may remain at decision block 106 until the external variable falls below the threshold.

In process block 110, the timer is stopped. In decision block 112, a check is performed to determine if the timer is between a range of values. If the timer is between the range of values, then processing moves to process block 114. If the timer is not between the range of values, then processing returns to process block 102. In process 114 properties of the emitted light are modulated.

As described above, the environmental variable(s) sensed by the sensor 14 may comprise the presence of a particular compound. The environmental variable(s) sensed by the sensor 14 may also comprise the absence of a particular compound (e.g., oxygen). The presence of a particular compound may comprise a presence of a particular chemical composition (e.g., a compound known to be flammable or harmful). The particular compound may comprise natural gas, ammonia, flammable materials, etc. For example, the indicator assembly 10 may be worn by a mine worker and the circuitry 16 may be configured to adjust property(ies) of the light emitted by the light source(s) 22 (e.g., color, intensity, etc.) in response to detecting gas or other harmful compounds.

As described previously, the circuitry 16 may be configured to adjust property(ies) of the light emitted by the light source(s) 22 in response to the sensed external variable(s). As an example, the circuitry 16 may control the light source(s) 22 to cause lighting effects including at least one of color-changing effects or pulsed light emissions.

As another example, the circuitry 14 may be configured to modulate a frequency of light emission by the light source(s) 22 based on the sensed external variable(s) according to a predetermined encoding. The predetermined coding may be used to communicate data regarding the external variable. For example, the predetermined encoding may be used to report the concentration of or the occurrence of sensed environmental variables. For example, the encoding may be known by an external monitor. The external monitor may include a camera or other light sensor positioned to sense the light emitted by the indicator assembly 10. The indicator assembly 10 may alter the frequency of emitted light based on the concentration of a detected compound (e.g., a harmful gas). The frequency of light emission may be outside of the limits of human perception. That is, the frequency of light emission may be fast enough that it is not perceptible to humans. For example, the frequency of light emission may be at least 60 hertz or at least 120 hertz.

The circuitry 16 may also be configured to store as events in a non-transitory computer readable medium 34 the external variable(s) detected by the sensor 14 and a time the external variable(s) was detected by the sensor 14. The circuitry 16 may analyze the stored events to determine external properties and/or patterns. For example, analyzing the stored events by the circuitry 16 may include determining a frequency of specific events detected by the sensor 14 and, based on the frequency of the specific events, adjusting a parameter of the light emitted by the light source(s) 22. As an example, the sensor 14 may detect light emitted from the headlights of passing cars. Each time headlights for a vehicle are detected, the circuitry may store the time that vehicle headlights were detected. If headlights are detected with a frequency greater than a predetermined frequency, the circuitry 16 may cause lighting effects including flashing the light emitting diodes 22 and/or varying the color emitted by the illumination assembly 12.

As will be understood by one of ordinary skill in the art, the circuitry 16 may have various implementations. For example, the circuitry 16 may include any suitable device, such as a processor, digital signal processor (DSP), Application Specific Instruction Set Processor (ASIP), Application Specific Integrated Circuit (ASIC), Field Programmable Gate Array (FPGA), programmable circuit, integrated circuit, memory and I/O circuits, an application specific integrated circuit, microcontroller, complex programmable logic device, other programmable circuits, or the like. The circuitry 16 may also include a non-transitory computer readable medium, such as random access memory (RAM), a read-only memory (ROM), an erasable programmable read-only memory (EPROM or Flash memory), or any other suitable medium. Instructions for performing the method described below may be stored in the non-transitory computer readable medium and executed by the circuitry.

As described above, the sensor 14 may sense propagating signals (e.g., radio waves). In this embodiment, the sensor 14 may comprise a wireless communication interface communicatively coupled to the circuitry 16. The wireless communication interface is configured to communicate with and receive parameters from a device separate from the indicator assembly 10. The circuitry 16 may be configured to adjust the control of the light source(s) 22 based on the received parameters. The outside device may include a satellite, computer, (e.g., server), mobile device, cellular tower, or any other suitable device capable of sending parameters to the indicator assembly 10.

The sensor 14 may communicate with the outside device via Bluetooth, WI-FI, radiofrequency, infrared, or via any suitable communication protocol. As will be understood by one of ordinary skill in the art, the sensor 14 may comprise a wireless network adaptor, or any suitable device that provides an interface between the outside device and the indicator assembly 10. The sensor 14 may be communicatively coupled to the computer readable medium 34, such that the sensor 14 is able to send data stored on the computer readable medium 34 and store received data on the computer readable medium 34. The sensor 14 may also be communicatively coupled to the circuitry 16 such that the circuitry 16 is able to control operation of the sensor 14. The sensor 14, computer readable medium 34, and circuitry 16 may be communicatively coupled through a system bus, mother board, or using any other suitable manner as will be understood by one of ordinary skill in the art.

The indicator assembly 10 may be used as a locator. For example, the indicator assembly 10 may be part of an illuminated clothing article 8 worn by scuba divers, firefighters, first responders, etc. Upon receiving the propagating signal, the circuitry 16 may be configured to cause the illumination assembly 12 to emit light, cause the illumination assembly 12 to emit flashing light, or change the color of the light emitted by the illumination assembly 12. In this way, the illuminated clothing article 8 can be used to help locate individuals wearing the illuminated clothing article 8.

The indicator assembly 10 may additionally include a location sensor configured to output a location of the indicator assembly. The location sensor may be part of the sensor 14. The sensor 14 may receive at least one location coordinate. The circuitry may be configured to modulate property(ies) of light emitted by the light source(s) based on a distance between the location of the indicator assembly 10 and the received location coordinate(s). The circuitry 14 may modulate the property(ies) of the light emitted by the light source(s) if the distance between the location of the indicator assembly and the received location coordinate(s) is less than a threshold. The threshold may be communicated to the wireless communication interface or may be predetermined.

The location sensor may comprise a GPS receiver or any suitable sensor capable of outputting a sensor of the indicator assembly 10. The sensor 14 may broadcast a GPS coordinate received form the GPS receiver. For example, the sensor 14 may continuously (or intermittently) broadcast the GPS coordinate received by the GPS receiver so that rescuers may determine the location of firemen in a structure. The GPS receiver may also broadcast an identifier of the indicator assembly 10 along with the GPS coordinate. Alternatively, the sensor 14 may broadcast the GPS coordinate only after receiving a request.

The light emitted by the indicator assembly 10 may also form a pattern capable of being used to determine a relative distance to the indicator assembly 10 from a given location. For example, the indicator assembly 10 may illuminate a shape (e.g., a triangle or polygon) having a known size. In this way, the illuminated shape is viewed from a distance, the perceived size of the illuminated shape may be compared to the known size of the shape to determine a relative distance to the indicator assembly 10.

Figure 5:
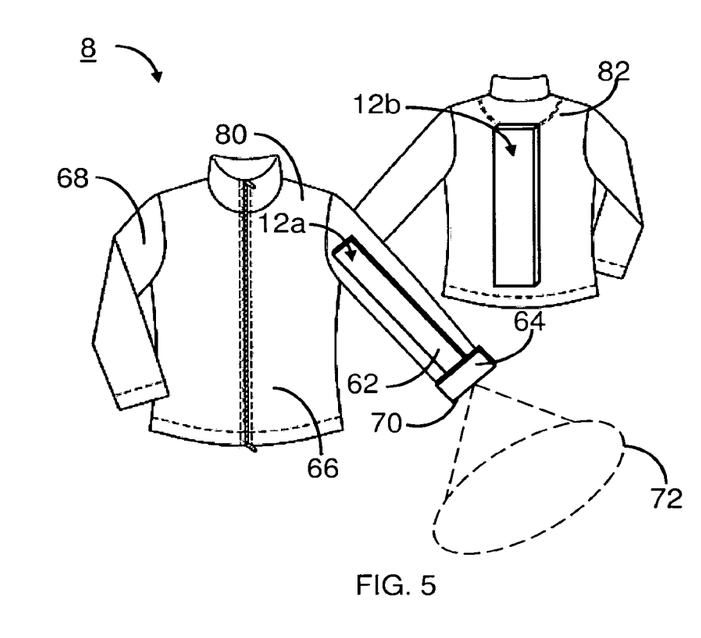
FIG. 5 shows another exemplary embodiment of an illuminated clothing article including the indicator assembly of FIG. 2.

Although a single illumination assembly 12 is shown in FIG. 2, the indicator assembly 10 may include more than one illumination assemblies 12 as shown in FIGS. 1 and 5.

With continued reference to FIGS. 1 and 5, the indicator assembly 10 may be incorporated into an illuminated clothing article 8. In the illuminated clothing article 8, the light emitting surface 26 of the light guide 24 of the indicator assembly 12 may additionally include a light signaling area 62 and an illumination area 64. Light may be emitted from the illumination area 64 of the light guide 24 at the distal end 32 of the light guide 24 or using a reflective lens included in the light guide 24. As an example, the illuminated clothing article 8 may also include a body portion 66 and a limb portion 68. The illumination area 64 may be located on a distal end 70 of the limb portion 68.

As shown in FIG. 5, the illumination area 64 may be configured to emit light from the light guide 24, such that a predetermined area 72 at a known distance and orientation from the illumination area 64 is illuminated. For example, the illumination area 64 may be formed on a cuff of a leg or on an end of a sleeve of the illuminated clothing article 8. The illumination area 64 may comprise a location of a user's hand when wearing the illuminated clothing article 8.

The illuminated clothing article 8 may include a front portion 80 and a back portion 82. The illumination assembly 12 may include a first illumination assembly 12a located on the front portion 80 and a second illumination assembly 12b located on a back portion 82 of the illuminated. A property of the light emitted by the first illumination assembly 12a may differ from the property of the light emitted by the second illumination assembly 12b. In this way, a front and back of a person wearing the illuminated clothing article can be identified based on, e.g., the color of light emitted by the illuminated clothing article 8.

The illuminated clothing article 8 may comprise a harness, vest, belt, helmet, jacket, shirt, gloves, and/or any other suitable article of clothing. When incorporated into an illuminated clothing article 8, the light guide may be formed of a flexible material (e.g., clad flat fiber or optical fibers) or small rigid light segments.

The illuminated clothing article 8 may additionally include an integrated display. The display may comprise an LCD fixed (e.g., sewn) to a sleeve of the illuminated clothing article 8. The display may comprise a flexible display.

The light emitted by the illumination assembly 12 may be patterned to convey information regarding an environmental variable sensed by the proximity sensor 14. In one example, the emission of light may convey that a certain gas is detected. In another example, the color of light being emitted from the illumination assembly 12 may convey a temperature of the environment.

Turning back to FIG. 1, the indicator assembly 10 may include a plurality of illumination assemblies 12. The circuitry 16 may control emission of light by the light source(s) 22 of each of the plurality of illumination assemblies 12, such that the light guide 24 of each of the plurality of illumination assemblies 12 emits light while the other plurality of illumination assemblies 12 are not emitting light. That is, the circuitry may control each of the illumination assemblies 12 such that each indicator assembly 12 emits light without the other illumination assembly 12 emitting light. This allows, e.g., the indicator assembly 10 to emit different colors of light sequentially. The circuitry 16 may also control emission of light by the plurality of illumination assemblies 12 such that the plurality of illumination assemblies are sequentially illuminated with respect to physical locations of the plurality of illumination assemblies. For example, the plurality of indicator assemblies 12 may be illuminated in an order from left to right such that the sequential illumination of the plurality of indicator assemblies gives the appearance of motion.

The sensor 14 of the illuminated clothing article 8 may receive parameters specifying a safety condition. For example, the received parameters may comprise the propagating signal sensed by the sensor 14. The circuitry 16 may be configured to modulate property(ies) of the light emitted by the light source(s) 22 based on the specified safety condition. The safety condition may comprise a warning regarding any suitable condition. For example, the safety condition may comprise a warning regarding an environmental condition (e.g., extreme weather, a sensed compound, etc.) or a status of a piece of equipment or another individual.

As another example, the illuminated clothing article 8 may include a light signaling area 62 located on a cuff. The circuitry 16 may be configured to change a property of the light emitted by the light signaling area depending on the received safety condition.

The illuminated clothing article 8 may also receive parameters specifying a group identifier. The circuitry 16 may be configured to modulate property(ies) of the light 22 emitted by the light source(s) according to a particular light property associated with the received group identifier. For example, members of a tour group may be divided into four sub groups. Each sub group may be assigned a particular color. The illuminated clothing article may emit the color associated with the sub group that a user of the illuminated clothing article is associated with. As another example, members of sports teams may be assigned a particular color.

As described above, the illumination assembly 12 includes light source(s) 22 and a light guide 24. The light source(s) 22 has a light emitting portion 28. Upon activation, the light source(s) 22 is configured to emit light having at least one wavelength via the light emitting portion 28. The light emitting portion 28 may comprise a surface of the light source(s) 22 adjacent and facing an input surface (e.g., a proximal end 30) of the light guide 24. As will be understood by one of ordinary skill in the art, the light source(s) 22 is not limited to illuminating a single surface of the light guide 24. For example, when the light source(s) 22 comprises multiple light emitting diodes, the light emitting diodes 22 may be located at separate locations along the light guide 24. Additionally, the input surface of the light guide 24 may be located along the light emitting surface 26 or a surface parallel to the light emitting surface 26.

Although less desirable then the previous and later described illumination assembly, the present invention broadly encompasses other solid state lighting assemblies. As will be understood by one of ordinary skill in the art, the other solid state lighting assemblies (e.g., an array of light emitting diodes, organic light emitting diode (OLED), etc.) may be substituted for the described illumination assembly.

The light source(s) 22 may include a first light source and a second light source. The first light source may be configured to output light having a different wavelength and/or at a different time interval than light emitted by the second light source. As will be understood by one of ordinary skill in the art, the light source(s) 22 may comprise multiple light emitting diodes, where each light emitting diode emits a different wavelength of light. In this way, by controlling (using e.g., the circuitry 16) the emission of light by the light emitting diodes, it is possible to control and vary the color of light emitted by the at least one light emitting diodes 22. For example, the light source(s) 22 may include a red light emitting diode, a green emitting diode, and a blue emitting diode.

The light source(s) 22 may comprise one or more light emitting diodes. However, as will be understood by one of ordinary skill in the art, the present invention is not limited to the use of light emitting diodes, but may include alternative or additional light sources including laser source(s), incandescent source(s), fluorescent source(s), or any other suitable source of light.

The light guide 24 is configured to propagate light (e.g., via total internal reflection). The light guide 24 includes a light emitting surface 26, a proximal end 30, a distal end 32, and an optical pattern 29. The proximal end 30 may be optically coupled to the light source(s) 22, such that the light emitted by the light source(s) 22 is received at the proximal end 30. The light received by the proximal end 30 of the light guide 24 is propagated (e.g., via total internal reflection) from the proximal end 30 towards a distal end 32 of the light guide 24. The optical pattern 29 is configured to cause light propagated by the light guide 24 to be emitted from the light emitting surface 26.

As will be understood by one of ordinary skill in the art, the light emitting surface 26 may comprise multiple areas of the light guide 24. For example, the light emitting surface 26 may be located on opposing sides (e.g., front and back) of a light guide or on separate distinct areas on a same side of the light guide 24.

The light guide 24 may include a core 31 surrounded by and in contact with a cladding 33. The cladding 33 may include one or more layers of materials of lower refractive index than the core 31. The cladding 33 causes light to be confined to the core 31 by total internal reflection at the boundary between the cladding 33 and the core 31. The optical pattern 29 may comprise variations and/or disruptions in the cladding 33 adjacent the light emitting surface 26. For example, the optical pattern 29 may include lensing features through the cladding layer. The optical pattern 29 may be formed in the cladding through chemical etching, laser etching, or using any suitable technique for causing variations in the cladding layer. The optical pattern 29 may alternatively comprise variations in an index of refraction of the light guide 24.

As will be understood by one of ordinary skill in the art, the light guide 24 may comprise a clad flat fiber light guide, parallel optical fibers, braided optical fibers, woven optical fibers, or any other suitable structure for propagating light. As described above, the propagation of light by total internal reflection may be facilitated by the light guide 24 being formed of a core 31 and cladding 33 surrounding at least a portion of the core 31, the core 31 having a different index of refraction than the cladding 33.

The optical pattern 29 may direct the propagating light towards the light emitting surface 26 such that at least a portion of the directed propagating light is output from the light guide 24. The optical pattern 29 may be configured to cause light to be emitted from the light emitting surface 26 having a desired (e.g., predetermined) illumination pattern. For example, the optical pattern 29 may be configured to extract light such that light output by the light emitting surface 26 has a defined intensity profile (e.g., a uniform intensity profile) and/or a defined light ray angle distribution. As an example, the optical pattern may be configured to cause light to be emitted from the light emitting surface, such that a portion of the emitted light appears as a symbol. The symbol may be an alphanumeric string, an image, or a symbol.

The optical pattern 29 may be formed by roughening, marring, abrading, etching, grit blasting or thermally deforming the light guide 24. For example, the light guide 24 may be passed between rollers that are roughened or serrated or covered with a diamond coating or grit sandpaper or other suitable abrasive material to provide an abrasive surface thereon for disrupting (e.g., marring or abrading) the light emitting surface 26 of the light guide 24 during passage between the rollers with the rollers pressing against the light guide 24 in a single inline process. The rollers may be heated or unheated. The other roller may be hard or have a deformable cover as desired. The size, depth, density and/or location of the optical pattern 29 may be varied as desired to cause propagated light to be emitted from the light emitting surface 26 in a uniform or non-uniform pattern as desired. As will be understood by one of ordinary skill in the art, any mechanical method may be applied to form the optical pattern 29.

Alternatively or additionally, the optical pattern 29 may be formed by light extracting elements configured to extract light from the light guide. The light extracting elements may be located between the light emitting surface 26 and another surface (e.g., located parallel to the light emitting surface). The light extracting elements may be shaped to extract light in a direction towards the light emitting surface 26.

The illumination assembly 12 may further include a diffusion layer adjacent the light emitting surface 26. The diffusion layer is configured to diffuse the light emitted from the light emitting surface 26. The diffusion layer may diffuse the light such that the light emitted by the light emitting surface 26 has a more uniform intensity with the diffusion layer present than if the diffusion layer is not present.

A reflector (e.g., a retroreflector) may also be integrated on a surface of the light guide 24 that is opposite the light emitting surface 26. The reflector may be configured to reflect back into the light guide 24 light that exits the light guide 24 at a surface other than the light emitting surface 26.

Components of the indicator assembly 10 may also be integrated into the reflector. For example, the sensor 14 and conductive traces may be bonded (e.g., printed) to a back surface of the reflector. As will be understood by one of ordinary skill in the art, the components integrated into the reflector are not limited to conductive traces, but may include any of the components of the indicator assembly 10 alone or in combination with other components.

As an example, electrical power may be supplied to the light source(s) 22 by conductive traces that are bonded directly to the reflector. The electrically conductive traces may include pads and additional electrical components to which electrical power is supplied. For example, electrical power may be provided via a plug-in connector interface on an edge of the light guide 24 (e.g., for connection by means of a standard cable connector to a power source 18). This enables electrical power to be supplied not only to the light emitting diodes 22, but also to other electrical components (e.g., switches) bonded to the reflector.

The conductive traces may also provide a means of creating current limiting resistance to the light source(s) 22. In one example, the circuitry 16 to each of the light source(s) 22 are equalized utilizing balancing resistors thereby allowing uniform electrical power distribution to each of the light source(s) 22 and providing uniform illumination from each of the light source(s) 22. In another example, the conductive traces are varied to provide variable resistance, increasing brightness of the at least one light emitting diodes 22 in selected areas of the light guide 24.

The conductive traces may also act as a fuse in the case of an electrical short.

As described above, the indicator assembly 10 may include a housing 20 containing the illumination assembly 12, sensor 14, and circuitry 16. The housing 20 may also include a power source 18 electrically isolated from electrical sources outside the housing. The illumination assembly 12 and circuitry 16 may also be isolated from electrical sources outside the housing. The housing 20 may also be electrically isolated from external electrical sources.

The housing 20 may be formed from one or more components. For example, the housing 20 may comprise an article of clothing or a portion of an article of clothing. The housing 20 may also be formed into a structure used to mark hazards in a dark environment. For example, a blanket, barrier, or pop-up structure. As will be understood by one of ordinary skill in the art, the housing 20 may be formed of any suitable material. For example, the housing 20 may be formed from plastic, rubber, metal, cloth, or a combination thereof.

The indicator assembly 10 may also include a wired connection to charge the power source 18, program the circuitry 16, etc. The wired connection may be a USB connection, an HDMI connection, a mini-USB connection, a mini-HDMI connection, or any other suitable connection for interfacing with the indicator assembly 10 to recharge the power source 18 or program the circuitry 16.

With additional reference to FIGS. 2 and 3, the indicator assembly 10 additionally includes a power source 18 for supplying power to the circuitry 16 and the light source(s) 22. The power source 18 may include a power storage unit 40 for storing electrical power and a power generator 42 configured to generate electricity. For example, the power storage unit 40 may include a battery, a capacitor, and/or any device capable of storing and providing electricity. The power generator 42 may include a piezoelectric generator, a thermovoltaic generator, a solar generator, or any other suitable device capable of generating electricity.

The power source 18 may be removably connected to other components of the self-contained indicator assembly 10, such that the power source 18 is replaceable. For example, the power source 18 may form an electrical connection with at least one of the illumination assembly 12, sensor 14, and circuitry 16 via contact pads. That is, the power source 18 may include electrical contacts on an outside surface of the power source 18. The housing 20 may include a receptacle for receiving the power source 18. The receptacle may include electrical contacts positioned such that, when the power source 18 is positioned in the receptacle, the electrical contacts of the power source 18 form an electrical connection with the electrical contacts of the receptacle. Upon opening the housing 20, the power source 18 may be removed from the receptacle and replaced with another power source 18. In this way, the lifespan of the indicator assembly 10 may be increased by replacing a power source 18 with another power source including a capacity for providing more electrical energy (e.g., an increased charge capacity) than the removed power source.

With further reference to FIG. 3, the sensor 14, the power source, the non-transitory computer readable medium 34, the power storage unit 40, and the power generator 42 are shown schematically using dotted lines. As will be understood by one of ordinary skill in the art, the position of the components is not limited by the representation of the components in FIG. 3.

All ranges and ratio limits disclosed in the specification and claims may be combined in any manner. Unless specifically stated otherwise, references to "a," "an," and/or "the" may include one or more than one, and that reference to an item in the singular may also include the item in the plural.

The transitional words or phrases, such as "comprising," "including," "carrying," "having," "containing," "involving," "holding," and the like, are open-ended, i.e., meaning including but not limited to.

Although the invention has been shown and described with respect to a certain embodiment or embodiments, equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. An illuminated clothing article that can be worn by an individual, the illuminated clothing article including:
   an indicator assembly comprising:
      an illumination assembly comprising at least one light source having a light emitting portion, wherein upon activation the at least one light source is configured to emit light having at least one wavelength via the light emitting portion;
      circuitry configured to modulate at least one property of the light emitted by the at least one light source;
      a location sensor communicatively coupled to the circuitry and configured to output a location of the indicator assembly, wherein the location sensor is a CiPS receiver: and
      a wireless communication interface configured to communicate with and receive at least one location coordinate from a device separate from the indicator assembly;
      wherein the circuitry is configured to modulate the at least one property of the emitted light based on a distance between the location of the indicator assembly and the received at least one location coordinate.

2. The illuminated clothing article of claim 1, wherein the sensor is also configured to sense at least one of a level of illumination, a velocity of the indicator assembly, properties of sound waves received by the indicator assembly, the level of illumination at a particular wavelength, or presence of a particular compound.

3. The illuminated clothing article of claim 2, wherein the presence of a particular compound comprises a presence of at least one of natural gas, ammonia, or flammable materials.

4. The illuminated clothing article of claim 1, wherein the at least one property of the light emitted by the at least one light source comprises at least one of starting or stopping emission of light, wavelength of emitted light, duration of emission of the emitted light, or intensity of the emitted light.

5. An indicator assembly comprising:
   an illumination assembly comprising at least one light source having a light emitting portion, wherein upon activation the at least one light source is configured to emit light having at least one wavelength via the light emitting portion;
   circuitry configured to modulate at least one property of the light emitted by the at least one light source;
   a location sensor communicatively coupled to the circuitry and configured to output location of the indicator assembly, wherein the location sensor is a GPS receiver; and
   a wireless communication interface configured to communicate with and receive at least one location coordinate from a device separate from the indicator assembly;
   wherein the circuitry is configured to modulate the at least one property of the emitted light based on a distance between the location of the indicator assembly and the received at least one location coordinate.

6. The indicator assembly of claim 5, wherein the illumination assembly further comprises a light guide configured to propagate light, the light guide including:
   a light emitting surface;
   a distal end;
   a proximal end optically coupled to the light emitting portion of the at least one light source, wherein the light emitted by the at least one light source is received at the proximal end and propagated from the proximal end towards the distal end of the light guide; and
   an optical pattern configured to cause the light propagated by the light guide to be emitted from the light emitting surface.

7. The indicator assembly of claim 5, wherein the sensor is also configured to sense at least one of a level of illumination, a velocity of the indicator assembly, properties of sound waves received by the indicator assembly, the level of illumination at a particular wavelength, or presence of a particular compound.

8. The indicator assembly of claim 7, wherein the presence of a particular compound comprises a presence of at least one of natural gas, ammonia, or flammable materials.

9. The indicator assembly of claim 1, wherein the at least one property of the light emitted by the at least one light source comprises at least one of starting or stopping emission of light, wavelength of emitted light, duration of emission of the emitted light, or intensity of the emitted light.

10. The indicator assembly of claim 5, wherein the circuitry is configured to modulate a frequency of light emission by the at least one light source based on the distance between the location of the indicator assembly and the received at least one location coordinate according to a predetermined encoding.

11. The indicator assembly of claim 10, wherein the frequency of light emission is at least 60 hertz.

12. The indicator assembly of claim 5, wherein the circuitry is also configured to receive a status of equipment separate from the indicator assembly.

13. The indicator assembly of claim 5, wherein the circuitry modulates the at least one property of the light emitted by the at least one light source if the distance between the location of the indicator assembly and the received at least one location coordinate is less than a threshold.

14. The indicator assembly of claim 5, wherein the circuitry is further configured to:
   receive parameters specifying a safety condition; and
   modulate at least one property of the light emitted by the at least one light source based on the specified safety condition.

15. The indicator assembly of claim 5, wherein the circuitry is further configured to:
   receive parameters comprising a group identifier; and
   modulate at least one property of the light emitted by the at least one light source according to a particular light property associated with the received group identifier.

16. An illuminated clothing article including the indicator assembly of claim 5, a front portion, and a back portion;
   wherein the illumination assembly includes a first illumination assembly and a second illumination assembly, the light guide of the first illumination assembly located on the front portion and the light guide of the second illumination assembly located on the back portion;
   wherein a property of the light emitted by the first illumination assembly differs from the property of the light emitted by the second illumination assembly.

17. The illuminated clothing article of claim 16, wherein the illuminated clothing article comprises a vest, belt, helmet, jacket, shirt, and/or gloves.

18. An illuminated clothing article including the indicator assembly of claim 5, a body portion, and a limb portion, wherein:

the light emitting surface of the light guide of the indicator assembly comprises a light signaling area and an illumination area;

the illumination area is located on a distal end of the limb portion; and     the illumination area is configured to emit light from the light guide, such that a predetermined area at a known distance and orientation from the illumination area is illuminated.

19. The indicator assembly of claim 5, wherein the at least one light source comprises a first light source and a second light source and the first light source is configured to:

output light having a different wavelength than light emitted by the second light source; and/or     output light at a different time interval than the light emitted by the second light source.

20. The indicator assembly of claim 5, further comprising a power source for supplying power to the circuitry and the at least one light source.

21. The indicator assembly of claim 20, further comprising a housing containing the power source and the circuitry, wherein the housing is electrically isolated from external electrical sources.

22. The indicator assembly of claim 6, wherein the optical pattern is configured to cause light to be emitted from the light emitting surface, such that a portion of the emitted light appears as a symbol.

23. The indicator assembly of claim 5, wherein:

the illumination assembly comprises a plurality of illumination assemblies; and     the circuitry controls emission of light by each of the plurality of illumination assemblies such that each of the plurality of illumination assemblies emits light while at least one of the other plurality of illumination assemblies are not emitting light.

24. The indicator assembly of claim 23, wherein the circuitry controls emission of light by the plurality of illumination assemblies such that the plurality of illumination assemblies are sequentially illuminated with respect to physical locations of the plurality of illumination assemblies.

\* \* \* \* \*